(12) United States Patent
Saino

(10) Patent No.: US 8,489,568 B2
(45) Date of Patent: Jul. 16, 2013

(54) DATA ACQUISITION APPARATUS AND DATA ACQUISITION METHOD

(75) Inventor: Yoko Saino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 12/437,424

(22) Filed: May 7, 2009

(65) Prior Publication Data

US 2009/0282011 A1 Nov. 12, 2009

(30) Foreign Application Priority Data

May 12, 2008 (JP) ................................. 2008-125151

(51) Int. Cl.
*G06F 17/30* (2006.01)
(52) U.S. Cl.
USPC .......................................................... 707/705
(58) Field of Classification Search
USPC .................... 707/705, 754, 999.001
See application file for complete search history.

(56) References Cited

U.S. PATENT DOCUMENTS

| | | | |
|---|---|---|---|
| 2002/0169793 A1* | 11/2002 | Sweeney | 707/204 |
| 2007/0245226 A1 | 10/2007 | Tsutsumi | |
| 2008/0024825 A1 | 1/2008 | Fujisawa | |
| 2008/0209572 A1* | 8/2008 | Kano et al. | 726/28 |
| 2009/0132538 A1* | 5/2009 | Kojima et al. | 707/9 |

FOREIGN PATENT DOCUMENTS

| | | |
|---|---|---|
| JP | 2002-170072 A | 6/2002 |
| JP | 2003-202893 A | 7/2003 |
| JP | 2004-94542 A | 3/2004 |
| JP | 2007-299119 A | 11/2007 |

* cited by examiner

*Primary Examiner* — Thu-Nguyet Le
(74) *Attorney, Agent, or Firm* — Canon U.S.A., Inc., IP Division

(57) ABSTRACT

A data acquisition apparatus includes an input unit configured to input acquisition data specification information, secret data specification information, and output format specification information, an acquisition unit configured to acquire data specified by the acquisition data specification information from a database, an output unit configured to output the acquired data in a format specified by the output format specification information, and a control unit configured to control at least one of the acquisition unit and the output unit so that data specified by the secret data specification information which is independent of the output format specification information is not output.

12 Claims, 14 Drawing Sheets

FIG. 3

```
<dataRetrieve>
  <server>
    http://database.hogehoge.com
  </server>
  <table name="Customer">
    <field type="string">Name</field>
    <field type="email">Email</field>
    <field type="address">Prefecture</field>
    <field type="address">City</field>
    <field type="phone">HomePhone</field>
    <field type="phone">CellPhone</field>
  </table>
</dataRetrieve>
```
~201

FIG. 4

Customer TABLE

| ID | Name (STRING TYPE) | E-mail (EMAIL TYPE) | Prefecture (ADDRESS TYPE) | City (ADDRESS TYPE) | HomePhone (PHONE TYPE) | CellPhone (PHONE TYPE) |
|---|---|---|---|---|---|---|
| 001 | HANAKO TANAKA | tanaka@abcd.com | TOKYO | OTA-KU | 03-1234-5678 | 090-111-1111 |
| 002 | TARO YAMADA | yamada@defg.com | KANAGAWA | YOKOHAMA | 045-4321-8765 | 090-222-2222 |
| 003 | ICHIRO SATO | sato@hijk.com | HOKKAIDO | CHITOSE | 0123-45-6789 | 090-333-3333 |

FIG. 5

```
<Mask>
 <data table="Customer"field="Email"></data>
 <data table="Customer"field="City">NONDISPLAY</data>
 <data table="Customer"type="phone">●●●-●●●●-●●●● </data>
</Mask>
```
~202

```
<table border="1">
 <tr>
    <td>NAME</td>
    <td>MAIL    </td>
    <td>PREFECTURE</td>
    <td>CITY    </td>
    <td>HOME PHONE</td>
    <td>CELL PHONE</td>
 </tr>
 <for listName="Customer"/>
  <tr>
    <td><data name="Customer.Name"/></td>
    <td><data name="Customer.Email"/></td>
    <td><data name="Customer.Prefecture"/></td>
    <td><data name="Customer.City"/></td>
    <td><data name="Customer.HomePhone"/></td>
    <td><data name="Customer.CellPhone"/></td>
  </tr>
 </for>
</table>
```

FIG. 7

```
<table border="1">
 <tr>
    <td>NAME</td>
    <td>MAIL   </td>
    <td>PREFECTURE</td>
    <td>CITY      </td>
    <td>HOME PHONE</td>
    <td>CELL PHONE</td>
 </tr>
 <tr>
   <td>HANAKO TANAKA</td>
   <td>tanaka@abcd.com</td>
   <td>TOKYO  </td>
   <td> OTA-KU </td>
   <td>03-1234-5678</td>
   <td>090-111-1111</td>
  </tr>
  <tr>
   <td>TARO YAMADA</td>
   <td>yamada@defg.com</td>
   <td>KANAGAWA  </td>
   <td>YOKOHAMA </td>
   <td>045-4621-8756</td>
   <td>090-222-2222</td>
  </tr>
  <tr>
   <td>ICHIRO SATO</td>
   <td>sato@hijk.com</td>
   <td>HOKKAIDO</td>
   <td>CHITOSE </td>
   <td>0123-45-6789</td>
   <td>090-333-3333</td>
   </tr>
</table>
```

FIG. 8

| NAME | MAIL | PREFECTURE | CITY | HOME PHONE | CELL PHONE |
|---|---|---|---|---|---|
| HANAKO TANAKA | tanaka@abcd.com | TOKYO | OTA-KU | 03-1234-5678 | 090-111-1111 |
| TARO YAMADA | yamada@defg.com | KANAGAWA | YOKOHAMA | 045-4321-8765 | 090-222-2222 |
| ICHIRO SATO | sato@hijk.com | HOKKAIDO | CHITOSE | 0123-45-6789 | 090-333-3333 |

FIG. 9

```
<table border="1">
  <tr>
    <td>NAME</td>
    <td>MAIL   </td>
    <td>PREFECTURE</td>
    <td>CITY    </td>
    <td>HOME PHONE</td>
    <td>CELL PHONE</td>
  </tr>
  <tr>
    <td>HANAKO TANAKA</td>
    <td>■■■■■</td>
    <td>TOKYO   </td>
    <td>NONDISPLAY</td>
    <td>●●●-●●●●-●●●●</td>
    <td>●●●-●●●●-●●●●</td>
  </tr>
  <tr>
    <td>TARO YAMADA</td>
    <td>■■■■■</td>
    <td>KANAGAWA   </td>
    <td>NONDISPLAY</td>
    <td>●●●-●●●●-●●●●</td>
    <td>●●●-●●●●-●●●●</td>
  </tr>
  <tr>
    <td>ICHIRO SATO</td>
    <td>■■■■■</td>
    <td>HOKKAIDO</td>
    <td>NONDISPLAY</td>
    <td>●●●-●●●●-●●●●</td>
    <td>●●●-●●●●-●●●●</td>
  </tr>
</table>
```
~212

FIG. 10

| NAME | E-MAIL | PREFECTURE | CITY | HOME PHONE | CELL PHONE |
|---|---|---|---|---|---|
| HANAKO TANAKA | ■■■■ | TOKYO | NONDISPLAY | ●●●-●●●●-●●●● | ●●●-●●●●-●●●● |
| TARO YAMADA | ■■■■ | KANAGAWA | NONDISPLAY | ●●●-●●●●-●●●● | ●●●-●●●●-●●●● |
| ICHIRO SATO | ■■■■ | HOKKAIDO | NONDISPLAY | ●●●-●●●●-●●●● | ●●●-●●●●-●●●● |

FIG. 13

DATA MANAGEMENT TABLE 1501

| No. | NAME (STRING TYPE) | E-MAIL (EMAIL TYPE) | Prefecture (ADDRESS TYPE) | City (ADDRESS TYPE) | HomePhone (PHONE TYPE) | CellPhone (PHONE TYPE) |
|---|---|---|---|---|---|---|
| 1 | HANAKO TANAKA | | TOKYO | | | |
| 2 | TARO YAMADA | | KANAGAWA | | | |
| 3 | ICHIRO SATO | | HOKKAIDO | | | |

TOTAL NUMBER: 3

FIG. 14

DATA MANAGEMENT TABLE 1601

| No. | NAME (STRING TYPE) | E-MAIL (EMAIL TYPE) | Prefecture (ADDRESS TYPE) | City (ADDRESS TYPE) | HomePhone (PHONE TYPE) | CellPhone (PHONE TYPE) |
|---|---|---|---|---|---|---|
| 1 | HANAKO TANAKA | ■■■■ | TOKYO | | ●●●●●-●●●●-●●●● | ●●●-●●●●-●●●● |
| 2 | TARO YAMADA | ■■■■ | KANAGAWA | | ●●●●●-●●●●-●●●● | ●●●-●●●●-●●●● |
| 3 | ICHIRO SATO | ■■■■ | HOKKAIDO | | ●●●●●-●●●●-●●●● | ●●●-●●●●-●●●● |

TOTAL NUMBER: 3

DATA ACQUISITION APPARATUS AND DATA ACQUISITION METHOD

BACKGROUND OF THE INVENTION

1. Field of the Invention

The present invention relates a data acquisition apparatus and a data acquisition method.

2. Description of the Related Art

Conventionally, as a form generation method, a form is generated by combining a template having a design of the form with data acquired from a data source such as a file and a database that store the data.

Meanwhile, when a document containing detailed information about transactions such as an invoice, a book, and a contract, or information indicating a specific person is printed or output to be displayed, masking processing is performed, in which, for example, a part or all of the information is expressed by the other characters, blacked out, or not displayed.

Techniques relating to the masking processing are discussed, for example, in Japanese Patent Application Laid-Open No. 2002-170072, and Japanese Patent Application Laid-Open No. 2004-94542. Japanese Patent Application Laid-Open No. 2002-170072 discusses a technique for providing data from a data file to a field defined on a form file that is a template representing a layout design of a form and combining the field and data to generate the form. In the technique, a masking method of the data to be combined on each field is specified. According to the specified masking method, output of a character string of the data to the field is controlled. For example, when "_" is specified in the field, a character of the data corresponding to the position is skipped. When "K" is specified in the field, a character of the data corresponding to the specified position is output. When "KKKKKK" is specified in a field in the form file where "ABCDEFGHIJ" is input as data, the six characters from the top, that is, "ABCDEF" are output. When "KKK_KKK" is specified in the field, "DEFG" corresponding to the position "_" are skipped, and "ABCHIJ" are output.

In Japanese Patent Application Laid-Open No. 2004-94542, a extensible markup language (XML) document including XML tags is generated based on a document logical structure. In accordance with the XML document, masking processing is performed. More specifically, document items such as a document number, date, and a headline are tagged by XML tags on a masking-target document. In addition, a specific area in a text specified by a user is tagged by the XML tag corresponding to the information. Then, a nondisclosure level is set for each tag. When the document is output, the XML tag corresponding to the specified nondisclosure-level is detected, and the document in which a point tagged by the detected tag is masked is generated and output.

However, in the technique discussed in Japanese Patent Application Laid-Open No. 2002-170072, the masking processing needs to be specified to each field. Accordingly, if data to be masked appears in a plurality of points in the form, it is necessary to specify the masking method for each point. Further, if a new design template is used, even if the data is supplied from the same data file, it is necessary to specify the masking again to the new design template.

The technique discussed in Japanese Patent Application Laid-Open No. 2004-94542 is not designed to generate a form by inputting data into a design template representing a design of the form. However, the point to be masked is specified in the document logical structure. Accordingly, it is necessary to tag all points to be masked in the document by a specific XML tag. Thus, even if the information is the same, when the information appears in a plurality of points in the document logical structure, it is necessary to tag all of the points.

SUMMARY OF THE INVENTION

The present invention is directed to improving operability in specifying data to be hidden in output data.

According to an aspect of the present invention, a data acquisition apparatus includes an input unit configured to input acquisition data specification information, secret data specification information, and output format specification information, an acquisition unit configured to acquire data specified by the acquisition data specification information from a database, an output unit configured to output the acquired data in a format specified by the output format specification information, and a control unit configured to control at least one of the acquisition unit and the output unit so that data specified by the secret data specification information which is independent of the output format specification information is not output.

Further embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

FIG. 3 illustrates an example of data acquisition instructions for specifying data to be acquired from a data source.

FIG. 4 illustrates an example of data in a database that is a data source.

FIG. 5 illustrates an example of secret instructions instructing masking processing to data specified by data acquisition instruction.

FIG. 6 illustrates an example of a template.

FIG. 7 illustrates an example that data acquired from a database is combined with the template in FIG. 6.

FIG. 8 illustrates a state that the combined data and template is rendered in a form that can be displayed.

FIG. 9 illustrates an example of a document generated by a document generation unit.

FIG. 10 illustrates a state that the generated document in FIG. 9 is rendered.

FIG. 13 illustrates an example of a data management table.

FIG. 14 illustrates an example of a data management table after alternative data is stored.

DETAILED DESCRIPTION OF THE EMBODIMENTS

Figure 1:
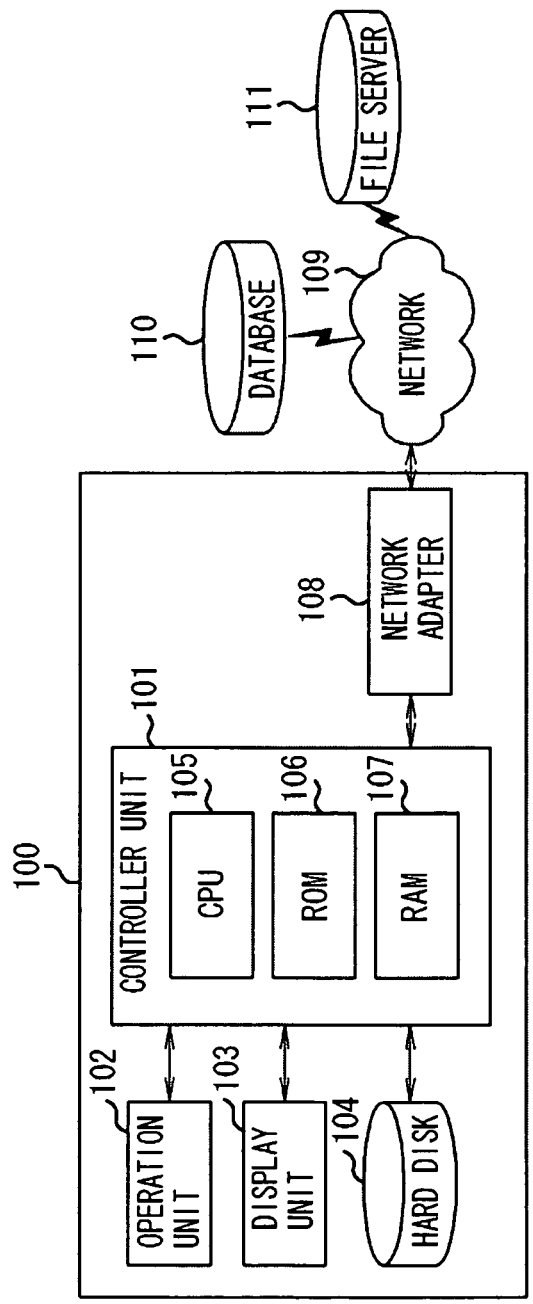
FIG. 1 is a block diagram illustrating a configuration of an information processing apparatus according to an exemplary embodiment of the present invention.

FIG. 1 is a block diagram illustrating a configuration of an information processing apparatus 100 according to an exemplary embodiment of the present invention. As illustrated in FIG. 1, the information processing apparatus 100 includes, as essential elements, a controller unit 101 that performs overall control of the information processing apparatus 100, an operation unit 102, a display unit 103, a hard disk 104, and a network adapter 108.

The controller unit 101 includes a central processing unit (CPU) 105, a read-only memory (ROM) 106, a random access memory (RAM) 107, and the like. The ROM 106 preliminarily stores various programs to be implemented by the CPU 105 and data necessary for the programs. A part of the programs or data may be stored in the hard disk 104 in advance, and read out to the RAM 107 to be implemented. In the exemplary embodiment, the hard disk 104 stores a program for generating a document, a generated document, a template used for document generation, data acquisition instruction information, secret instruction information, and the like. The RAM 107 temporarily stores data acquired from a data source and intermediate data generated during execution of a program.

The operation unit 102 receives user input. The operation unit 102 includes a keyboard and a mouse. The display unit 103 displays a graphical user interface (GUI) of application for implementing the processing. On a display, the GUIs such as a panel, a button, and a text field of the application are displayed. In response to input from the operation unit 102 such as the keyboard or the mouse, a program corresponding to each GUI part is executed.

The network adapter 108 is used to communicate with a database 110 and a file server 111 via a network 109, and is, for example, a local area network (LAN) card.

Figure 2:
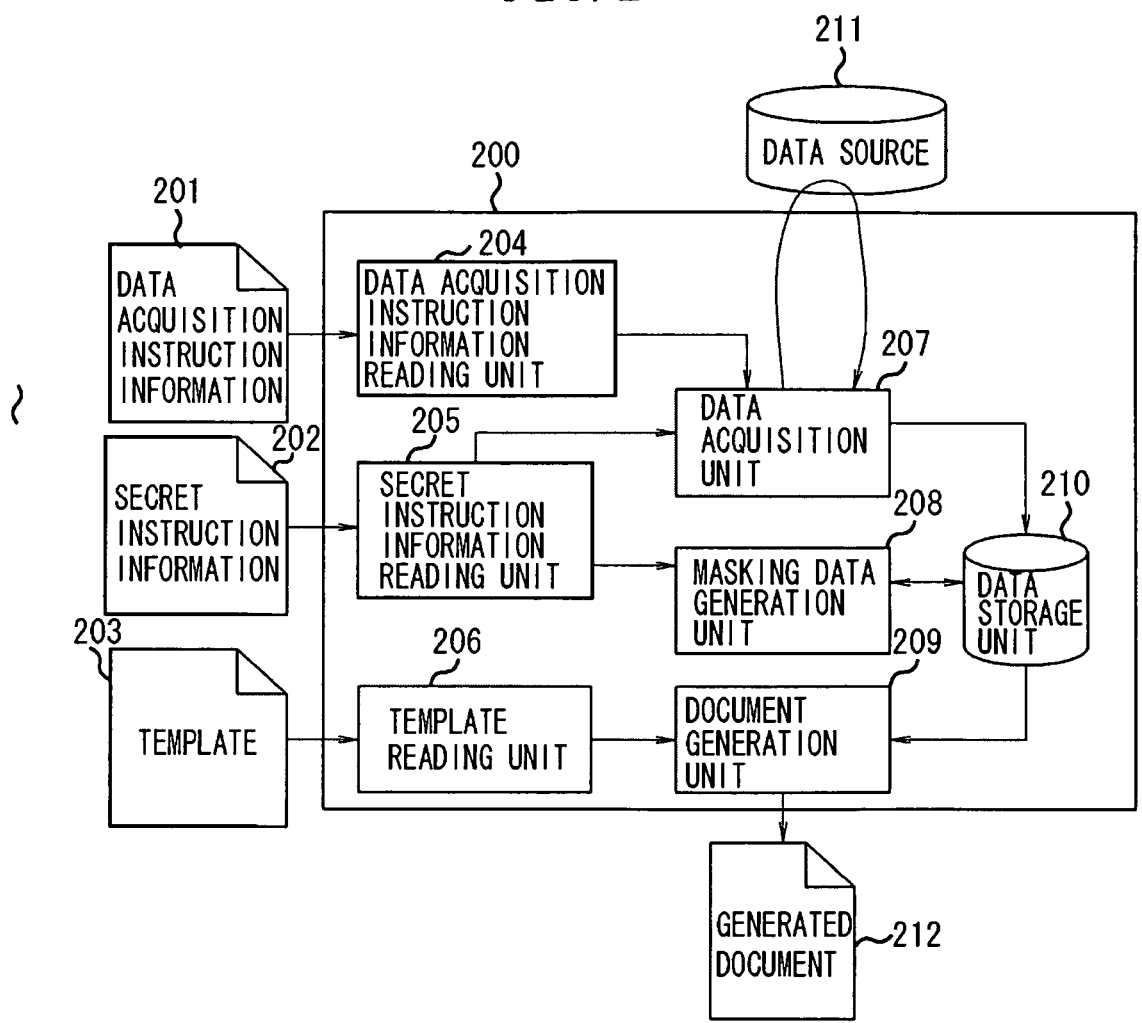
FIG. 2 illustrates a functional configuration of a document generation system implemented by the information processing apparatus according to the exemplary embodiment of the present invention.

FIG. 2 illustrates a functional configuration of a document generation system 200 implemented by the information processing apparatus 100. FIG. 2 illustrates a function that is performed by reading and executing the program stored in the ROM 106 by the CPU 105 in FIG. 1. The document generation system 200 acquires data from a data source 211 corresponding to the database 110 in FIG. 1. Then, the document generation system 200 combines a specified template with the data acquired from the data source 211 to generate a document. In the generated document, a part of the data to be combined is masked and output according to specified secret instruction information.

Each information to be input into the document generation system 200 and each of the configurations forming the document generation system 200 will be described. Data acquisition instruction information 201 is information to specify data to be acquired from the data source 211. A template 203 is a document that contains an indicator for embedding data acquired from the data source 211. In the exemplary embodiment, a document containing the indicator in a layout design of a document is defined as the template.

Secret instruction information 202 is information instructing a masking method for the data specified by the data acquisition instruction information 201. More specifically, the secret instruction information 202 specifies data acquired from the data source 211 that is masked according to attribute information of the data. In the exemplary embodiment, the alternative data to be used for masking is specified together with the specification of masking target data. For example, a specific character string and an image are specified as the alternative data. In the exemplary embodiment, masking includes blacking out of an output, and outputting by replacing the specified data with particular data. Examples of the data acquisition instruction information 201, the template 203, and the secret instruction information 202 will be described below.

A data acquisition instruction information reading unit 204, a secret instruction information reading unit 205, and a template reading unit 206 are functional configurations for reading the specified data acquisition instruction information 201, the secret instruction information 202, and the template 203 from the hard disk 104 respectively.

A data acquisition unit 207 acquires data specified by the data acquisition instruction information 201 from the data source 211. The acquired data is stored in a data management table in a data storage unit 210. In the data acquisition instruction information 201, a data acquisition destination and information for specifying data to be acquired are specified. For example, the data source 211 is an external relational database, and data is acquired by using a Structured Query Language (SQL) for operating the data source 211. In the data acquisition instruction information 201, an access destination of the target data source 211, and a table name, a field name, and a type of data to be acquired are specified.

In the data acquisition unit 207, an SQL query statement is generated based on the table name and the field name. Using the SQL statement, the data acquisition unit 207 queries the specified data source 211. Then, the data acquisition unit 207 acquires data returned from the data source 211. Meanwhile, in pieces of the data specified by the data acquisition instruction information 201, data that is specified to be masked by the secret instruction information 202 is replaced with alternative data for masking. More specifically, the alternative data is treated as the masked data, which is masking data. Accordingly, it is not necessary to acquire the masking target data from the data source 211. Therefore, the data acquisition unit 207 does not specify the acquisition instruction with the SQL statement to the data specified as the masking target by the secret instruction information 202 among the data specified by the data acquisition instruction information 201.

As described above, since the masking target data is not acquired, time for acquiring the redundant information from the data source 211 can be saved. The data acquired from the data source 211 except for the masking target data is stored in the data storage unit 210. In the exemplary embodiment, the data storage unit 210 is the RAM 107.

The masking method included in the secret instruction information 202 can specify a part of the data to be masked without replacing the entire data. In such a case, the masking target data is also acquired from the data source 211. For example, it is assumed that the data acquired from the data source 211 is "090-1111-1111", and as to the acquired data, "☐☐☐-●●●●-●●●" is specified as the masking method in which "☐" means directly outputting data appearing at the corresponding position, and the other characters are used as alternative characters for masking. In such a case, "090-●●●●-●●●" is used as the data resulted from implementing the masking specification, namely the masking data. As described above, generating the masking data by using the actual data is referred to as "partial masking".

It is possible to acquire all of the data described in the data acquisition instruction information 201 from the data source 211 and store the data except for the data specified by the secret instruction information 202 into the data storage unit 210. Further, all of the information specified in the data acquisition instruction information 201 may be acquired from the data source 211 and stored into the data storage unit 210.

Then, the data may be overwritten by masking data generated in a masking data generation unit 208.

The masking data generation unit 208 acquires the secret instruction information 202 from the secret instruction information reading unit 205, and generates the masking data. The secret instruction information 202 describes which data is to be masked in the pieces of data described in the data acquisition instruction information 201. Further, the alternative data to be used to mask the masking target data is specified.

The masking data generation unit 208 firstly identify the masking target data. Then, the masking data generation unit 208 fixes alternative data to be used to mask the data. If a specific character string is specified as the alternative data, the character string is stored in the data storage unit 210 (in a data management table therein). As described above, when the secret instruction information 202 includes an instruction to perform the partial masking, the masking data generation unit 208 stores partially masked data in the data storage unit 210 as instructed.

A document generation unit 209 generates a document 212 based on the template 203 acquired from the template reading unit 206 and the data stored in the data storage unit 210. The template 203 is document information that includes a design of the document and contents for forming a document such as a logic structure and a text of the document and an image. In the template 203, data to be combined with the template is specified. The document generation unit 209 acquires combination target data specified in the template 203 from the data storage unit 210 (more specifically, from the data management table therein), and combines the data with the template to form a document. The document generation unit 209 develops a generated document 212 by performing combination processing according to all combination instructions described in the template 203.

FIG. 3 illustrates an example of the data acquisition instruction information 201 for specifying data to be acquired from the data source 211. In the exemplary embodiment, the data acquisition instruction information 201 is described as an Extensible Markup Language (XML) document. Further, an example of the data acquisition instruction information 201 for acquiring data stored in the data source 211 that is used as a database is described.

As illustrated in FIG. 3, in the data acquisition instruction information 201, a database access destination, a type of a table and a field to be acquired are specified. A <server> element specifies an access destination to a database. The drawing illustrates that it is possible to access a database at "http://database.hogehoge.com". A <table> element and a <field> element indicate a table and a field of target data to be acquired from the database respectively. A name attribute in the <table> element indicates a name of the table. A type attribute in the <field> element indicates a type of the data in the field. "String" indicates a character string, "email" indicates a character string of data having electronic mail information, "address" indicates a character string of data having address information, and "phone" indicates a character string of data having phone number information. A content of the <field> element indicates a name of the field. More specifically, the data acquisition instruction information 201 in FIG. 3 indicates that data in the fields named; Name, Email, Prefecture, City, HomePhone, and CellPhone is acquired from a table named Customer in the accessible database.

FIG. 4 illustrates an example of data in the database namely the data source 211. FIG. 4 illustrates a state that the pieces of data are stored in the Customer table in the database. The Customer table includes fields of Name, Email, Prefecture, City, HomePhone, and CellPhone. FIG. 4 illustrates that three pieces of data from ID001 to ID003 having values in each field in the Customer table are stored. When the data acquisition instruction information 201 illustrated in FIG. 3 is specified and the table is accessed, the three pieces of data of the ID001, the ID002, and the ID003 are acquired.

FIG. 5 illustrates an example of the secret instruction information 202 that instructs processing for masking the data specified by the data acquisition instruction information 201. In the exemplary embodiment, the secret instruction information 202 is described as an XML document.

A <Mask> element is a root element of secret information. A <data> element specifies target data subjected to masking processing in the pieces of data specified by the data acquisition instruction information 201. A table attribute indicates a name of a table in a database. A field attribute indicates a field name of the table in the database specified by the table attribute. These attributes indicate that masking is performed when the values of the specified fields in the table are combined with a template. A type attribute indicates a type of the data. When the type attribute is specified instead of the field attribute, the data having the type indicated in the attribute value is masked.

In contents of the data element, alternative data to be used when masking processing is performed is specified. When nothing is specified, masking processing is performed using a black square, i.e., a default processing. When a character string is specified, masking processing is performed using the specified character string as the alternative data. In the example, the default black square is used as the alternative data for masking the value in the Email field in the Customer table. Further, for the value in the City field, a character string of "NONDISPLAY" is used as the alternative data for the masking. For the value having the field type of "phone", a character string of "●●●-●●●●-●●●●" is used as the alternative data for the masking.

FIG. 6 illustrates an example of the template 203. In the exemplary embodiment, the template is illustrated as an XML document. <table>, <tr>, and <td> elements are examples of elements that have similar meaning to HTML elements. The <table> element indicates data of a table. The <tr> element indicates data of a row. The <td> element indicates data of a column. A <for> element means that a child element is repeatedly output. In a listName attribute value, a table name of the database specified by the data acquisition instruction information 201 is described. The <for> element means that the child element is repeatedly output to a number of pieces of the acquired data specified by the listName attribute value.

A <data> element specifies combining of the data acquired by the data acquisition instruction information 201 in place of the <data> element. For a name attribute, the data to be combined is specified in a format of "table name". "field name". More specifically, when "Customer.Name" is specified, the value in the Name field in the Customer table is substituted.

FIG. 7 illustrates an example that data acquired from a database is combined with the template in FIG. 6. FIG. 7 illustrate an example of the generated document 212 in a case where the data acquisition instruction information 201 illustrated in FIG. 3 and the data in the database illustrated in FIG. 4 is used and secret instruction information is not specified. The values of the individual fields in the customer table acquired from the database according to the instruction of the <for> element are combined and output at predetermined positions in the acquired order. The three pieces of data from the data ID001 to the data ID003 are output.

To facilitate the understanding of the description, FIG. 8 illustrates a state that the example illustrated in FIG. 7 is rendered in a form that can be displayed. In the template in FIG. 6, descriptions for combining the data from the database are added to an HTML format. The document generated in the document generation unit 209 by combining the data acquired from the database is output as an HTML document. When the document is displayed on a Web browser, a table illustrated in FIG. 8 is output. In a first row, item names in the table are displayed. In second, third, and fourth rows, the data from the ID001 to the ID003 acquired from the database are displayed.

FIG. 9 illustrates an example of the document 212 generated in the document generation unit 209. The generated document 212 is output when the data acquisition instruction information 201 in FIG. 3, the secret instruction information 202 in FIG. 5, and the template 203 in FIG. 6 are used and the data stored in the Customer table in the database is the data in FIG. 4. Based on the secret instruction information in FIG. 5, the Email field, the City field, and the HomePhone and CellPhone fields that have the type of "phone" are masked using the alternative data specified for the individual fields.

FIG. 10 illustrates a state that the generated document 212 in FIG. 9 is rendered. As described above, the template 203 in FIG. 7 is described according to the format for specifying data to be combined with the HTML format. Accordingly, the template 203 is rendered and displayed by the Web browser as illustrated in FIG. 10. Based on the secret instruction information in FIG. 5, the specified data is masked by the specified alternative data and displayed.

Figure 11:
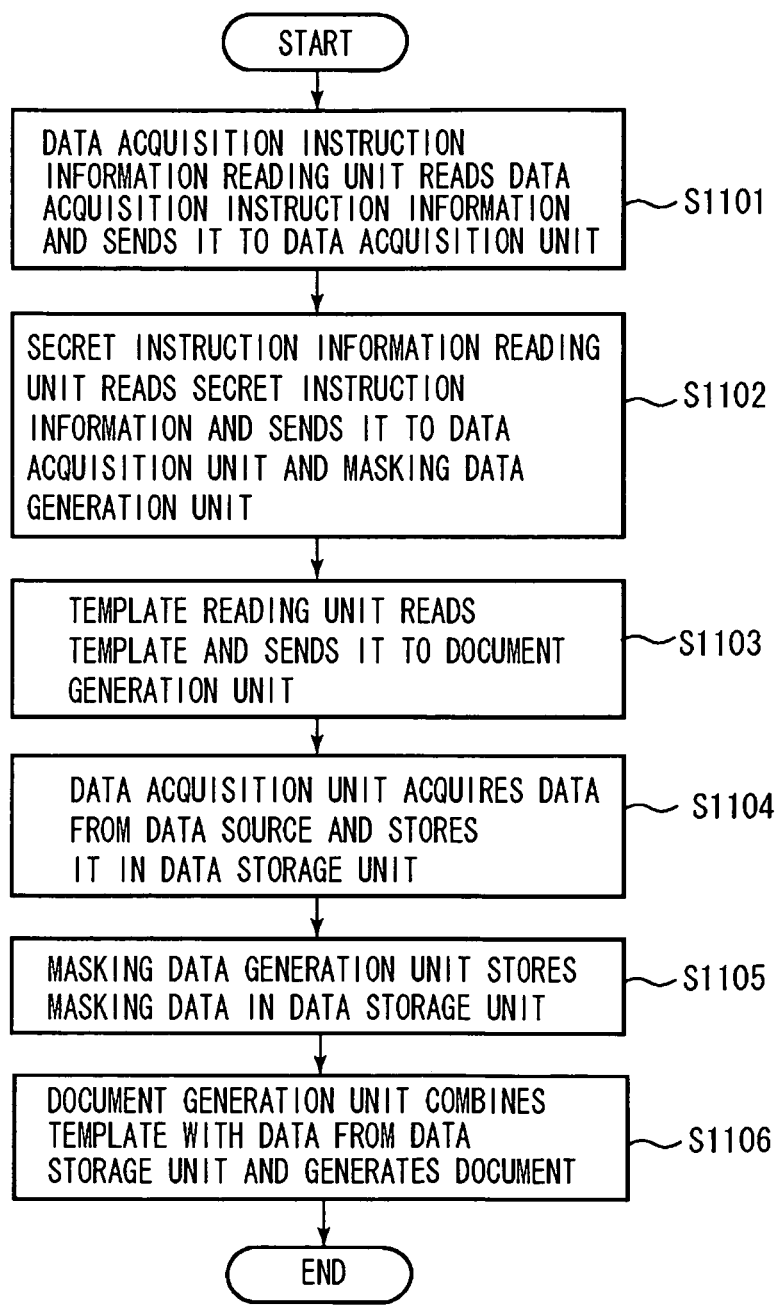
FIG. 11 is a flowchart illustrating overall processing.

Next, a processing flow of the exemplary embodiment is described with reference to a flowchart in FIG. 11. In FIG. 11, a processing flow of the document generation system 200 is described with reference to FIG. 2.

First, in steps S1101, S1102, and S1103, processing to read the data acquisition instruction information 201, the secret instruction information 202, and the template 203 is performed. In the flowchart, the reading processing is performed in the order of steps S1101, S1102, and S1103. However, the reading processing may be performed in the other order.

In step S1101, the data acquisition instruction information reading unit 204 reads the specified data acquisition instruction information 201, and sends the read information to the data acquisition unit 207. In step S1102, the secret instruction information reading unit 205 reads the specified secret instruction information 202, and sends the read information to the data acquisition unit 207 and the masking data generation unit 208. In step S1103, the template reading unit 206 reads the template 203, and sends the read data to the document generation unit 209.

In the exemplary embodiment, the data acquisition instruction information 201, the secret instruction information 202, and the template 203 are stored in the hard disk 104 as files. Accordingly, the specified files are read. If the files are stored in the external file server 111 and a uniform resource locator (URL) of the file server is specified, the specified URL is accessed and the files are acquired and read.

In step S1104, the data acquisition unit 207 acquires data from the data source 211 as the data source based on the data acquisition instruction information 201 acquired from the data acquisition instruction information reading unit 204 and the secret instruction information 202 acquired from the secret instruction information reading unit 205. Then, the data acquisition unit 207 stores the data in a data management table in the data storage unit 210. Since the data specified by the secret instruction information 202 is to be masked with specified alternative data, it is not necessary to acquire the data from the data source 211. Thus, the data acquisition unit 207 determines the masking target data using the secret instruction information 202, and does not acquire the masking target data from the data source 211.

However, if the masking target data is also acquired from the data source 211 and stored in the data storage-unit 210, the data acquisition unit 207 does not use the secret instruction information 202. In this case, the secret instruction information reading unit 205 does not need to send the secret instruction information 202 read in step S1102 to the data acquisition unit 207.

In step S1105, the masking data generation unit 208 associates the alternative data to be used for masking with the masking target data according to the secret instruction information 202, and stores the associated data into the data management table in the data storage unit 210.

In step S1106, the document generation unit 209 generates the document 212 using the template 203 acquired from the template reading unit 206 and the data stored in the data management table in the data storage unit 210. In the template 203, data to be combined with the template is described. The document generation unit 209 acquires the data specified by the description from the data storage unit 210 and combines the data with the template to generate the document 212.

Figure 12:
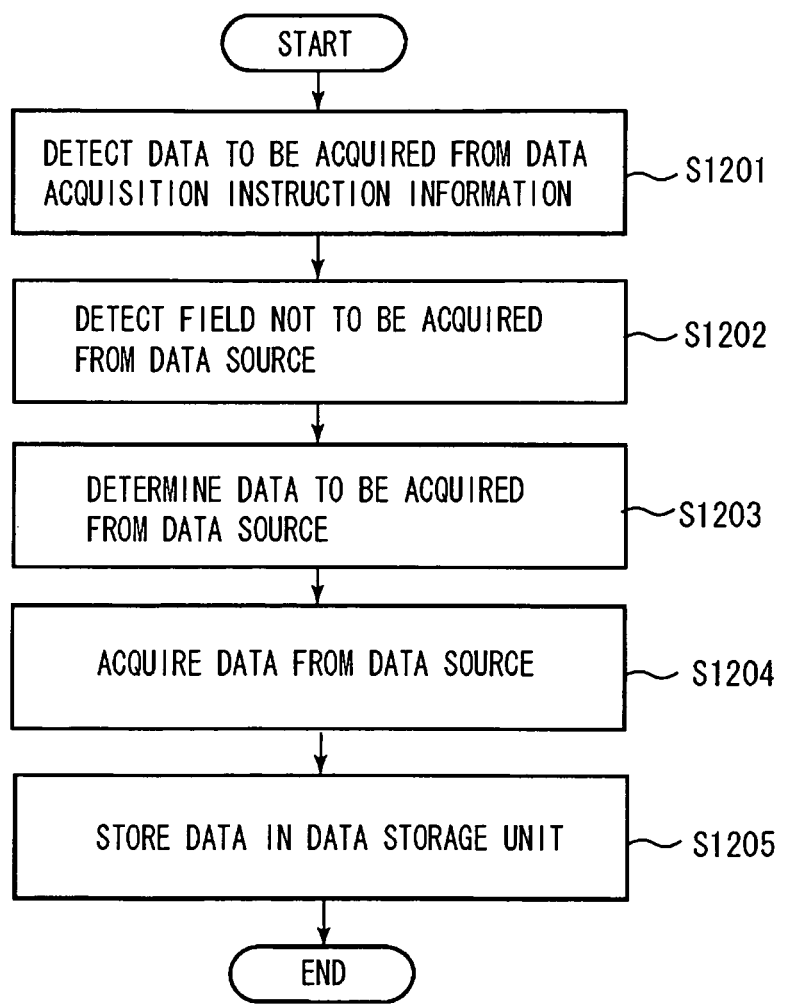
FIG. 12 is a flowchart illustrating processing performed in a data acquisition unit.

Next, processing performed in the data acquisition unit 207 is described with reference to a flowchart in FIG. 12. Processing performed after the data acquisition instruction information illustrated in FIG. 3 is acquired from the data acquisition instruction information reading unit 204 is described.

In step S1201, the data acquisition unit 207 identifies data to be acquired form the data acquisition instruction information 201. The data acquisition unit 207 sequentially reads the data acquisition instruction information 201 from the top, and processes the information of each element. More specifically, the data acquisition unit 207 detects "http://database.hogehoge.com" that is a content of the <server> element as an access destination. Then, the data acquisition unit 207 detects a table name from the name attribute of the <table> element, and a field type and a field name from the type attribute and a content of the <field>. In a case of the data acquisition instruction information 201 in FIG. 3, the following data namely, a Name field (string type), an Email field (email type), a Prefecture (address type), a City field (address type), a HomePhone field (phone type), and a CellPhone (phone type) in the Customer table are detected.

In step S1202, the data acquisition unit 207 sequentially reads the secret instruction information 202 from the top, and detects information to be masked. In a case of the secret instruction information 202 in FIG. 5, the table name, the field name, and the field type of the masking target data are described as a table attribute value, a field attribute value, and a type attribute value of the <data> element. More specifically, the data acquisition unit 207 detects the data in the Email field, the City field, and the HomePhone field and the CellPhone field that have the data type of "phone" in the Customer table as the masking target data.

In step S1203, the data acquisition unit 207 determines data to be acquired from the data source 211. The data acquisition unit 207 excludes the data names detected in step S1202 from the field names detected in step S1201 and acquires the data of remaining field names. More specifically, the data acquisition unit 207 determines to acquire the data of the Name field and the Prefecture field which are obtained by excluding the Email, City, HomePhone, and CellPhone fields from the Name, Email, Prefecture, City, HomePhone, and CellPhone fields.

In step S1204, the data acquisition unit 207 acquires the data from the data source 211 based on the above determination. In step S1204, first, the data acquisition unit 207 generates an SQL statement for acquiring the data in the fields determined in step S1203 from the data source 211. Since it has been determined to acquire the values of the Name field and the Prefecture field in the Customer table by the step S1203, the data acquisition unit 207 generates the SQL statement "SELECT Name, Prefecture FROM Customer" for acquiring the data. The data acquisition unit 207 queries the database "database.hogehoge.com" that is the data source 211 using the generated SQL statement and acquires the data.

The data acquisition unit 207 may generate an SQL statement "SELECT COUNT(*) FROM Customer" for acquiring the number of pieces of data registered in the Customer table, and query the data source 211. By the processing, also in a case where the masking processing is specified to all of the fields in the secret instruction information, it is possible to output the number of pieces of the data registered in the Customer table.

In step S1205, the data acquisition unit 207 stores the data acquired form the data source 211 into the data storage unit 210. At this time, the data acquisition unit 207 forms a data management table (Customer table) to store the Customer data in the data storage unit 210, and stores the acquired data in the table. FIG. 13 illustrates an example of the data management table. A data management table 1501 has information about all field names and the types specified in the data acquisition instruction information. The data management table 1501 stores the data acquired from the data source 211 in columns of the corresponding field names.

FIG. 13 illustrates a data storage state when the values of the Name field and the Prefecture field from the ID001 to the ID003 are acquired in step S1204. If the secret instruction information instructs that all pieces of the data described in the data acquisition instruction information are masked, the data management table stores only the number of pieces of the data acquired in step S1204.

Next, a processing flow of the masking data generation unit 208 is described. Processing performed after the secret instruction information 202 in FIG. 5 is acquired from the secret instruction information reading unit 205 is described.

First, the masking data generation unit 208 extracts the data fields and the masking character strings described in the acquired secret instruction information 202. More specifically, the masking data generation unit 208 reads the table attribute value, the field attribute value, and the type attribute value of the <data> element and the contents (alternative data) from the secret instruction information 202 in FIG. 5. As described above, the table attribute indicates the table name of the data source 211, the field attribute indicates the field name, and the type attribute indicates the data type of the field. By using the attribute values, it is possible to specify to which field in the data source 211 the data belongs. The contents of the <data> element indicate the alternative data to be used for masking processing. The specified character string is used as the alternative data. When there is no content, the black square is used as the default character string.

Accordingly, the masking data generation unit 208 recognizes that the masking processing is performed from the top of the secret instruction information 202 in FIG. 5 on the Email field in the Customer table using the default black square character string. Further, the masking data generation unit 208 recognizes that the masking processing is performed on the City field in the Customer table using the character string of "NONDISPLAY". Further, the masking data generation unit 208 recognizes that the masking processing is performed on the fields having the data type of "phone" in the Customer table using "●●●-●●●●-●●●●".

Then, according to the information identified in step S1201, the masking data generation unit 208 stores the alternative data to be used for masking into the data management table 1501 in the data storage unit 210. FIG. 14 illustrates a data management table 1601 formed as a result of storage of the alternative data.

As illustrated in FIG. 14, the black squares are specified to be used as the alternative data with respect to the Email field in the data management table and stored in the columns in the Email field in the data management table 1601. With respect to the City field in the data management table, the character string of the "NONDISPLAY" is specified to be used. Accordingly, the character string of "NONDISPLAY" is stored in the columns in the City field in the data management table 1601. With respect to the phone type fields in the data management table, the character string of the "●●●-●●●●-●●●●." is specified to be used for the masking processing. Accordingly, the masking data generation unit 208 searches for the phone type data in the data management table and stores the alternative data of "●●●-●●●●-●●●●". In this example, the HomePhone field and the CellPhone field are determined to be the phone type as a result of the search. Accordingly, the masking data generation unit 208 stores the alternative data to the columns of the two fields. As described above, the alternative data used for the masking is stored in the data management table and, the data management table 1601 illustrated in FIG. 14 is formed.

Figure 15:
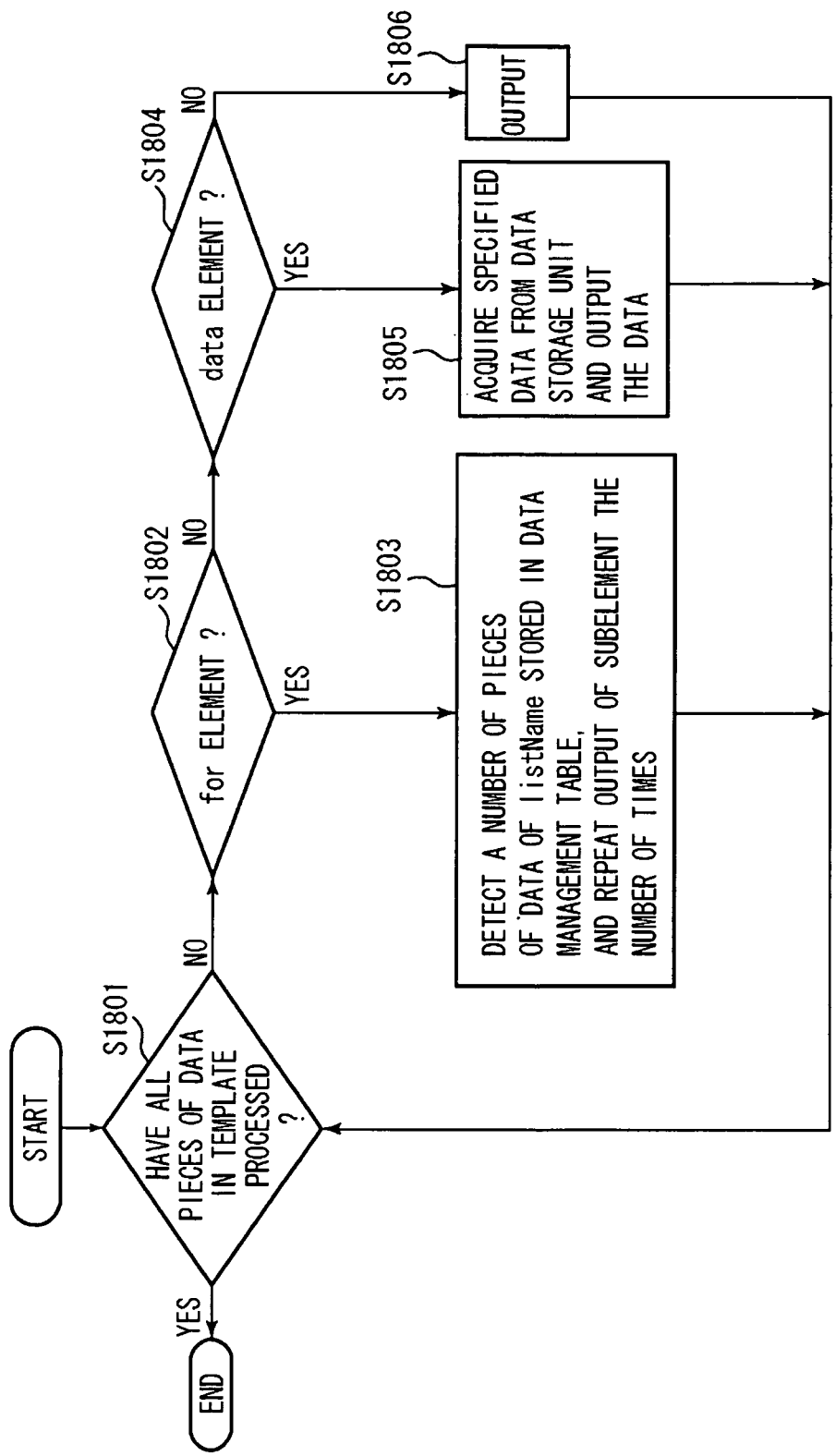
FIG. 15 is a flowchart illustrating processing performed in a document generation unit.

Finally, a processing flow of the document generation unit 209 is described with reference to a flowchart in FIG. 15. First, the document generation unit 209 reads the template 203 acquired from the template reading unit 206 and searches for a description including an instruction about data combination in the template 203. In a case of a template 601 illustrated in FIG. 6, the <for> element that instructs to repeatedly output a child element and the <data> element that instructs to replace with specified data correspond to the above description. Then, according to the instruction description about the data combination, the document generation unit 209 acquires the data specified in the template from the data management table formed by the masking data generation unit 208 and combines the data with the template.

A processing flow of the document generation unit 209 for the template illustrated in FIG. 6 is described with reference to a flowchart in FIG. 15. In the processing, XML elements are sequentially processed from the top.

In step S1801, the document generation unit 209 determines whether all elements in the template have been processed. When the all elements have been processed (YES in step S1801), the document generation unit 209 ends the processing. Until the all elements have been processed, the document generation unit 209 performs processing according to read XML elements.

In step S1802, the document generation unit 209 determines whether the read element is the <for> element. When the read element is the <for> element (YES in step S1802), the processing proceeds to step S1803. In step S1803, the document generation unit 209 acquires the number of pieces of stored data from the data management table whose name is described in the listName attribute value in the <for> element. Then, the document generation unit 209 repeats output processing to an element under a child element for the number of times corresponding to the acquired number of pieces of the data. Since the <for> element is the element for specifying the repeating processing of the child element, the <for> element is not output to the generated document. The listName attribute value of the <for> element in the template 601 is "Customer". Accordingly, the document generation unit 209 acquires the number of pieces of the data from the data management table stored in the data storage unit 210.

In the case of the data management table illustrated in FIG. 14, the number of the pieces of the data is three. Therefore, the output of the child element <tr> of the <for> element and the element under the child element is repeated three times. Further, if it is instructed to combine the data in the data management table by the child element and the element under the child element of the <data> element, the document generation unit 209 sequentially reads the data in ascending order from the data management table for each repetition and combines all pieces of the data stored in the data management table with the template.

In step S1804, the document generation unit 209 determines whether the read element is the <data> element. When the read element is the <data> element (YES in step S1804), the processing proceeds to step S1805. In step S1805, the document generation unit 209 acquires the data specified by the name attribute value in the <data> element from the data management table, and outputs the data for the generated document in place of the <data> element. For example, when "Customer.Name" is described in the name attribute value, the document generation unit 209 reads the value of the Name field from the data management table 1601. When a first processing by the <for> element is performed, "HANAKO TANAKA" stored in the row No. 1 is output to the generated document. Similarly, "■■■■", "TOKYO", "NONDISPLAY", "●●●-●●●●-●●●●", and "●●●-●●●●-●●●●" are output respectively to the name attribute values of "Customer.Email", "Customer.Prefecture", "Customer.City", "Customer.HomePhone", and "Customer.CellPhone".

When it is determined that the element read from the template is not associated with the data combination, more specifically, in the exemplary embodiment, when the document generation unit 209 determines that the element is an element other than the <for> element and the <data> element (NO in step S1804), the processing proceeds to step S1806. In step S1806, the element is directly output. When all elements in the template are processed, the document generation unit 209 ends the processing. The document formed by the output elements is the generated document 212. When the data management table in FIG. 14 is used as the template illustrated in FIG. 6, the generated document illustrated in FIG. 9 is formed.

In the exemplary embodiment, the XML document has been used as the template. However, it is not limited to the above embodiment, but a document of any other format may be used. In the exemplary embodiment, it is defined that the template is formed by adding instruction descriptions for data acquired from the data source 211 to a document format to be generated finally. Further, the instruction description for combining data can be distinguished from other descriptions, namely the descriptions according to the document format to be finally generated. The document generation unit 209 in the exemplary embodiment directly outputs descriptions other than the instruction description for combining data. Accordingly, the document generation unit 209 does not identify the format of the data to be directly output. Therefore, the generated document 212 is not limited to the XML document described in the exemplary embodiment. Other formats such as a portable document format (PDF), Microsoft Word, Comma Separated Values (CSV) data may also be used.

In the exemplary embodiment, the example of the one piece of secret instruction information has been described. If a document in which points to be masked vary depending on a user using the document system or a level of confidential information permitted for the user is to be generated, the document can be generated by changing the secret instruction information to be sent to the secret instruction information reading unit depending on the user or the level of the confidential information.

As described above, the masking data generation unit 208 generates masking data corresponding to data to be masked based on the secret instruction information 202 for specifying the data to be masked in pieces of data acquired according to the data acquisition instruction information 201. Then, the document generation unit 209 combines the acquired data and the masking data with the template 203. Accordingly, if the template 203 is to be changed, a masked document can be generated without specifying a method for masking data again.

In the exemplary embodiment, points to be masked is specified with respect to data acquired from the data source 211. Accordingly, even if the data is laid out on a plurality of points in the template 203, there is no need to specify the masking for each point while searching the template 203 for the points where the data appears.

Each unit and each step constituting the above-described exemplary embodiment of the present invention may be implemented by operating a program stored in a computer readable storage medium such as a RAM or a ROM in a computer. In such a case, the program and the computer-readable recording medium recording the program constitute the present invention.

Further, the present invention may be embodied as a system, an apparatus, a method, a program, a recording medium, or the like. More specifically, the present invention may be applied to an apparatus comprising a single apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-125151 filed May 12, 2008, which is hereby incorporated by reference herein in its entirety.

What is claimed is:

1. A data acquisition apparatus comprising:
an input unit configured to input acquisition data specification information, secret data type specification information, and output format specification information, wherein a data type not to be output is specified collectively by the secret data type specification information, and the secret data type specification information specified part of the acquisition data specification information;
an acquisition unit configured to acquire data specified by the acquisition data specification information from a database storing data corresponding to a data type;
an output unit configured to output the acquired data in a format specified by the output format specification information; and
a control unit configured to control at least one of the acquisition unit and the output unit based on the secret data type specification information so that data specified to be hidden by the secret data type specification information is not output; and
wherein the description of the secret data type specification information is independent of the description of the output format specification information, the control unit controls the output unit to output predetermined data instead of the data specified to be hidden by the secret data type specification information, the predetermined data is not the data specified to be hidden by the secret data type specification information, but the predetermined data comprises a character string, and the overall shape of the character string suggests the secret data type without need to decode the secret data type from values of characters in the character string.

2. The data acquisition apparatus according to claim 1, wherein the data specified to be hidden by the secret data type specification information is not acquired from the database even if that data is specified to be acquired by the acquisition data specification information.

3. The data acquisition apparatus according to claim 1, wherein the data specified by the acquisition data specification information is acquired from the database, and the acquired data is output by hiding a part thereof when the secret data type specification information instructs to hide that part of the acquired data.

4. The data acquisition apparatus according to claim 1, wherein data corresponding to a field and a field's type of the data is stored in the database, a field of the data to be acquired is specified in the acquisition data specification information, and at least one of a field and a type of the data to be hidden is specified in the secret data type specification information.

5. A method for acquiring data comprising:
inputting acquisition data specification information, secret data type specification information, and output format specification information, wherein a data type not to be output is specified collectively by the secret data type specification information, and the secret data type specification information specified part of the acquisition data specification information;
acquiring data specified by the acquisition data specification information from a database storing data corresponding to a data type;
outputting the acquired data in a format specified by the output format specification information; and
controlling at least one of the acquiring and the outputting based on the secret data type specification information so that data specified to be hidden by the secret data type specification information is not output; and
wherein the description of the secret data type specification information is independent of the description of the output format specification information, the outputting is controlled so that predetermined data is output instead of the data specified to be hidden by the secret data type specification information, the predetermined data is not the data specified to be hidden by the secret data type specification information, but the predetermined data comprises a character string, and the overall shape of the character string suggests the secret data type without need to decode the secret data type from values of characters in the character string.

6. The method according to claim 5, wherein the data specified to be hidden by the secret data type specification information is not acquired from the database even if that data is specified to be acquired by the acquisition data specification information.

7. The method according to claim 5, wherein the data specified by the acquisition data specification information is acquired from the database, and the acquired data is output by hiding a part thereof when the secret data type specification information instructs to hide a part of the acquired data.

8. The method according to claim 5, wherein data corresponding to a field and a type of the data stored in the database is stored in the database, a field of the data to be acquired is specified in the acquisition data specification information, and at least one of a field and a type of the data to be hidden is specified in the secret data type specification information.

9. A computer readable storage medium storing a computer program for acquiring data, the program comprising:
instructions for inputting acquisition data specification information, secret data type specification information, and output format specification information, wherein a data type not to be output is specified collectively by the secret data type specification information, and the secret data type specification information specified part of the acquisition data specification information;
instructions for acquiring data specified by the acquisition data specification information from a database storing data corresponding to a data type;
instructions for outputting the acquired data in a format specified by the output format specification information; and
instructions for controlling at least one of the acquiring and the outputting based on the secret data type specification information so that data specified by the description of secret data type specification information which is independent of the description of output format information is not output; and
wherein the program controls the outputting so that predetermined data is output instead of the data specified to be hidden by the secret data type specification information, the predetermined data is not the data specified to be hidden by the secret data type specification information, but the predetermined data comprises a character string, and the overall shape of the character string suggests the secret data type without need to decode the secret data type from values of characters in the character string.

10. The computer readable storage medium according to claim 9, wherein the program does not acquire the data specified to be hidden by the secret data type specification information from the database even if that data is specified to be acquired by the acquisition data specification information.

11. The computer readable storage medium according to claim 9, wherein the program acquires the data specified by the acquisition data specification information from the database, and outputs the acquired data by hiding a part thereof when the secret data type specification information instructs to hide that part of the acquired data.

12. The computer readable storage medium according to claim 9, wherein data corresponding to a field and a type of the data stored in the database is stored in the database, a field of the data to be acquired is specified in the acquisition data specification information, and at least one of a field and a type of the data to be hidden is specified in the secret data type specification information.

* * * * *